(12) United States Patent
Wight

(10) Patent No.: US 7,548,592 B2
(45) Date of Patent: Jun. 16, 2009

(54) MULTIPLE INPUT, MULTIPLE OUTPUT COMMUNICATIONS SYSTEMS

(76) Inventor: James Stuart Wight, 300 Queen Elizabeth Drive, Apt. 9A, Ottawa, Ontario (CA) K1S 3M6

( * ) Notice: Subject to any disclaimer, the term of this patent is extended or adjusted under 35 U.S.C. 154(b) by 652 days.

(21) Appl. No.: 10/954,429

(22) Filed: Sep. 30, 2004

(65) Prior Publication Data

US 2006/0008024 A1     Jan. 12, 2006

Related U.S. Application Data

(63) Continuation-in-part of application No. 10/884,633, filed on Jul. 2, 2004.

(51) Int. Cl.
*H04L 27/00* (2006.01)
*H03K 9/00* (2006.01)
(52) U.S. Cl. .................. 375/299; 375/260; 375/295; 375/316
(58) Field of Classification Search ............ 375/267, 375/146, 147, 347, 295, 296, 260, 299, 316
See application file for complete search history.

(56) References Cited

U.S. PATENT DOCUMENTS

| | | | | |
|---|---|---|---|---|
| 6,091,361 | A * | 7/2000 | Davis et al. ............ | 342/378 |
| 6,307,882 | B1 * | 10/2001 | Marzetta ............... | 375/224 |
| 6,446,025 | B1 * | 9/2002 | Nakamura et al. ....... | 702/159 |
| 6,483,478 | B2 * | 11/2002 | Yu et al. ................ | 343/853 |
| 6,757,339 | B1 * | 6/2004 | Ratnarajah et al. ...... | 375/308 |
| 6,785,520 | B2 | 8/2004 | Sugar | |
| 6,859,503 | B2 | 2/2005 | Pautler et al. | |
| 6,870,882 | B1 * | 3/2005 | Al-Dhahir et al. ....... | 375/233 |
| 6,888,809 | B1 | 5/2005 | Foschini et al. | |
| 6,897,807 | B2 | 5/2005 | Kishigami et al. | |
| 6,965,762 | B2 | 11/2005 | Sugar et al. | |
| 7,016,657 | B2 | 3/2006 | Boariu | |
| 7,039,369 | B2 | 5/2006 | Horng | |
| 7,069,050 | B2 * | 6/2006 | Yoshida .................. | 455/562.1 |
| 7,095,709 | B2 * | 8/2006 | Walton et al. ............ | 370/208 |
| 7,113,558 | B2 | 9/2006 | Lozano et al. | |
| 7,136,437 | B2 * | 11/2006 | Benesty et al. .......... | 375/347 |

(Continued)

OTHER PUBLICATIONS

USPTO; File History U.S. Appl. No. 11/469,075 to Wight, filed Aug. 31, 2006; Application Filed.

(Continued)

*Primary Examiner*—Chieh M Fan
*Assistant Examiner*—Jason M. Perilla
(74) *Attorney, Agent, or Firm*—Stolowitz Ford Cowger LLP

(57) ABSTRACT

Embodiments of the present invention include systems and methods for optimizing the transmitter and receiver weights of a MIMO system. In one embodiment, the weights are optimized to create and steer beam nulls, such that each transmitted signal is substantially decoupled from all other signals between a MIMO transmitter a MIMO receiver. In another embodiment, the weights are selected such that, the signal strength of each weighted signal transmitted through a communications channel along a respective signal path is substantially equivalent, but for which the weighting vectors are not necessarily orthogonal. In a further embodiment, each transmitted signal is coupled only between its own transmitter and receiver antennas with a gain, or eigenvalue, that is a consequence of the weights, and which is bounded to within a desired range of values while at the same time the weighing vectors are orthogonal. Embodiments employing various decomposition techniques are also provided.

18 Claims, 6 Drawing Sheets

U.S. PATENT DOCUMENTS

| | | |
|---|---|---|
| 7,203,249 B2 | 4/2007 | Raleigh et al. |
| 7,206,606 B2 * | 4/2007 | Kobayashi et al. ......... 455/562.1 |
| 7,245,679 B2 * | 7/2007 | Aoki et al. .................. 375/349 |
| 7,263,132 B2 | 8/2007 | Horng et al. |
| 7,266,157 B2 | 9/2007 | Sim et al. |
| 7,289,552 B2 * | 10/2007 | Kwak et al. ................. 375/147 |
| 7,308,026 B2 * | 12/2007 | Purho ......................... 375/233 |
| 2002/0118781 A1 | 8/2002 | Thomas et al. |
| 2002/0126045 A1 * | 9/2002 | Kishigami et al. .......... 342/417 |
| 2002/0154705 A1 * | 10/2002 | Walton et al. ............... 375/267 |
| 2003/0063654 A1 * | 4/2003 | Onggosanusi et al. ....... 375/130 |
| 2003/0185310 A1 * | 10/2003 | Ketchum et al. ............ 375/259 |
| 2003/0203743 A1 | 10/2003 | Sugar et al. |
| 2004/0023621 A1 | 2/2004 | Sugar et al. |
| 2004/0032910 A1 | 2/2004 | Horng et al. |
| 2004/0076248 A1 * | 4/2004 | Purho ......................... 375/350 |
| 2004/0082356 A1 * | 4/2004 | Walton et al. ............... 455/522 |
| 2004/0136316 A1 * | 7/2004 | Kwak et al. ................. 370/208 |
| 2004/0136349 A1 * | 7/2004 | Walton et al. ............... 370/338 |
| 2004/0165676 A1 | 8/2004 | Krishnan et al. |
| 2004/0189523 A1 * | 9/2004 | Kishigami et al. .......... 342/417 |
| 2004/0190636 A1 | 9/2004 | Oprea |
| 2004/0209579 A1 | 10/2004 | Vaidyanathan |
| 2004/0247054 A1 * | 12/2004 | Ferreol et al. ............... 375/340 |
| 2005/0078762 A1 * | 4/2005 | Ketchum et al. ............ 375/267 |
| 2005/0101259 A1 | 5/2005 | Tong et al. |
| 2005/0101352 A1 | 5/2005 | Logothetis et al. |
| 2005/0129137 A1 * | 6/2005 | Yamada et al. .............. 375/267 |
| 2005/0152484 A1 | 7/2005 | Sandhu et al. |
| 2005/0287962 A1 * | 12/2005 | Mehta et al. ................. 455/101 |
| 2006/0148429 A1 * | 7/2006 | Inogai et al. .............. 455/115.1 |
| 2007/0253476 A1 * | 11/2007 | Tirkkonen et al. .......... 375/230 |
| 2007/0253508 A1 * | 11/2007 | Zhou et al. .................. 375/267 |
| 2007/0258536 A1 * | 11/2007 | Kim et al. .................... 375/267 |
| 2008/0043873 A1 * | 2/2008 | Ariyavisitakul ............. 375/267 |

OTHER PUBLICATIONS

USPTO; File History U.S. Appl. No. 11/469,075 to Wight, filed Aug. 31, 2006; Jul. 24, 2007 through Jul. 31, 2007.

USPTO; File History U.S. Appl. No. 11/469,075 to Wight, filed Aug. 31, 2006; Oct. 19, 2007 through Nov. 27, 2007.

USPTO; File History U.S. Appl. No. 11/469,075 to Wight, filed Aug. 31, 2006; Mar. 12, 2007 through May 1, 2008.

USPTO; File History U.S. Appl. No. 11/469,075 to Wight, filed Aug. 31, 2006; Jun. 23, 2008 through Oct. 10, 2008.

USPTO; File History U.S. Appl. No. 11/469,075 to Wight, filed Aug. 31, 2006; Nov. 4, 2008 through Dec. 31, 2008.

USPTO; File History U.S. Appl. No. 10/884,633 to Wight, filed Jul. 2, 2004; Application filed.

USPTO; File History U.S. Appl. No. 10/884,633 to Wight, filed Aug. 31, 2006; Aug. 27, 2004 through Jan. 19, 2006.

USPTO; File History U.S. Appl. No. 10/884,633 to Wight, filed Aug. 31, 2006; Jan. 24, 2006 through Nov. 27, 2008.

USPTO; File History U.S. Appl. No. 10/884,633 to Wight, filed Aug. 31, 2006; Feb. 29, 2008 through Mar. 31, 2008.

USPTO; File History U.S. Appl. No. 10/884,633 to Wight, filed Aug. 31, 2006; Jun. 9, 2008 through Oct. 7, 2.

USPTO; File History U.S. Appl. No. 10/844,633 to Wight, filed Aug. 31, 2006; Nov. 4, 2008.

* cited by examiner

MULTIPLE INPUT, MULTIPLE OUTPUT COMMUNICATIONS SYSTEMS

CROSS-REFERENCE TO RELATED APPLICATION

This application claims the benefit of and priority to U.S. patent application Ser. No. 10/884,633 filed on Jul. 2, 2004, the disclosure of which is hereby incorporated herein by reference in its entirety.

FIELD OF THE INVENTION

The present invention is generally related to wireless communication systems, and more particularly to improved systems and methods for transmission and reception of multiple data streams in a multiple-input, multiple-output communications channel.

BACKGROUND OF THE INVENTION

In wireless communications systems, designers often grapple with the difficult problem of reliably transmitting a signal through a complex and dynamic environment. Fixed obstacles, such as buildings, streets or walls reflect and refract transmitted signals in varying amounts, causing elements of the signals to be distorted, separated, phase-shifted or delayed. Dynamically moving obstacles, such as automobiles, bicyclists, and pedestrians further complicate the environment, or transmission channel. Consequently, after being transmitted from a source location, multiple copies of the same signal may be received at different times, at different phases, and with differing distortions at a single receiver, depending on the path each respective signal traversed through the transmission channel. These undesirable properties force designers to make various trade-offs among signal quality, propagation delay, channel capacity, amplification, frequency and error correction requirements.

In an effort to increase channel capacity, designers have implemented systems which employ multiple antennas in both transmitters and receivers. Typically, the antennas are spaced apart as an array at both transmission and reception locations. Each antenna within its respective array is generally configured to maintain a specific gain and phase relationship with the other antennas within the array. These gain and phase relationships are typically maintained by weighting the signal, prior to transmission, with an appropriate weighting vector. In a properly configured transmitter array, the end result is that the array produces a transmission pattern that is more focused on a given receiver than that which could be produced by a comparable single antenna.

Antenna arrays were previously used to improve signal quality. Use of antenna arrays at both the transmitter and receiver has recently been proposed to increase channel capacity. When multiple antennas are used at the transmitter and receiver, the wireless channel between them may be referred to as a multiple-input, multiple-output (MIMO) channel. MIMO systems rely on the existence of multipath propagation between a transmitter and a receiver. Individual beams, pointing in different directions and carrying different traffic, can be formed at a multi-antenna transmitter. In addition, individual received beams, carrying different traffic and arriving from sufficiently different angles, can be separated at the multi-antenna receiver through a combination of nulling and subtraction.

To date, most MIMO systems have been constructed to minimize the processing power required at the mobile unit (which include, for example, cellular telephones). Doing so allows the mobile units to be smaller, more power efficient and less expensive than they might otherwise be. Consequently, system designers have typically kept the processor-intensive and power consuming mechanisms required to form and manage individual data channels at the base station, where power supplies are significantly greater and where the benefits of such systems outweigh their costs.

Base station only processing requires the base station to have Channel State Information (CSI) describing the state of the communications channel between the base station and the mobile unit. In cellular systems, for example, where the forward and reverse channels are typically confined to different frequency bands, the CSI must be forwarded to the base station from the mobile units, which then requires some increase in processing and power consumption at the mobile units. Techniques such as Minimum Mean Squared Error (MMSE), Transmit Zero Forcing, and the use of Filter Banks have been used to address these problems, but all have met with limited success.

Although MIMO systems frequently result in increased cost and complexity, MIMO systems have numerous advantages over their traditional counterparts. Perhaps most notably, MIMO systems are able to dramatically increase the data throughput rate of a given channel without any associated increase in bandwidth or constellation order. This allows more information to be transmitted through the same channel, which facilitates clearer voice communications, higher data throughput, and more reliable wireless transmissions.

Despite their advantages, however, existing MIMO systems have also been burdened with significant disadvantages. In a typical MIMO system, for example, multiple signals are transmitted from multiple antennas at the same time and at the same frequency. In these systems, the transmitted signals will tend to interfere with each other, resulting in cross-talk among wireless communication paths or channels. This interference is undesirable, and leads to signal distortion, phase shifting or even cancellation. Furthermore, in existing implementations, signal-to-noise ratios for individual data streams transmitted between a MIMO transmitter and MIMO receiver may be substantially different, resulting in highly different bit error rates, and creating additional difficulties in transmission.

SUMMARY OF THE INVENTION

Thus, a need exists for an improved system and method for forming individual channels between a transmitter and a receiver which can support multiple simultaneous signals, with significantly reduced or eliminated interference between the signals. A need also exists for an improved MIMO system which can transmit signals such that the individual data streams have equal or near equal signal-to-noise ratios at the MIMO receiver. Furthermore, a need exists for a reliable system which can be employed in transmitters and receivers, mobile units and base stations.

In satisfaction of this need, systems and methods are provided for optimizing the transmitter and receiver weights of a MIMO system. In one embodiment, the weights within a MIMO transmitter and a MIMO receiver are optimized to create and steer beam nulls, such that each transmitted signal is substantially decoupled from all other transmitted signals. In another embodiment, the weights are selected such that the signal strength of each weighted signal transmitted through a communications channel along a respective signal path is substantially equivalent, but the weighting vectors are not necessarily orthogonal, resulting in residual crosstalk. In yet another embodiment, each transmitted signal is coupled only between its own transmitter and receiver antennas with a gain, or eigenvalue, that is a consequence of the weights, and which may be bound to any desired range of values while at the same time, the weighting vectors remain orthogonal.

In accordance with one aspect of the invention, a MIMO signal transmitter for use in a MIMO system is provided, wherein the MIMO system includes a receive array. The MIMO signal transmitter includes: two signal inputs, each signal input configured to provide a respective input signal; two vector multipliers, each configured to weight a respective input signal with a vector to form a weighted signal; and, two antennas comprising a transmit array. The array is configured to transmit each weighted signal along a respective preferred signal path. Each vector is selected such that the signal strength of each weighted signal received at the receive array along its respective signal path is substantially equivalent.

In accordance with another aspect of the invention, a MIMO system is provided. The MIMO system includes: a MIMO transmitter comprising a first array of antennas, configured to transmit signals; a MIMO receiver comprising a second array of antennas configured to receive signals from the MIMO transmitter. A plurality of transmit vector multipliers are in electrical communication with the MIMO transmitter, each configured to weight a respective transmit signal with a vector to form a weighted transmit signal. A plurality of receive vector multipliers are in electrical communication with the MIMO receiver. Each receive vector multiplier is configured to weight a respective receive signal with a vector to form a weighted receive signal. Preferably, each transmit vector is selected such that, at the MIMO receiver, the signal strength of each weighted transmit signal received along a respective signal path is substantially equivalent.

In accordance with yet another aspect of the invention, a method of assigning antenna array weighting factors to a plurality of input signals for use in a MIMO system is provided. Preferably, the MIMO system includes a MIMO transmitter and a MIMO receiver. The method includes: in the MIMO transmitter, weighting each input signal with an appropriate transmit weight to form a plurality of weighted forward-link signals; transmitting each of the weighted forward-link signals to a MIMO receiver; and in the MIMO receiver, choosing receive weights in order to minimize the range of gain values, and to orthogonalize each weighted forward-link signal received.

In accordance with yet another aspect of the invention, a method of assigning antenna array weighting factors to a plurality of signals is provided. In accordance with this method, a transmission matrix representing a transmission channel through which the signal will travel is initially calculated. Next, a gain is calculated for each signal. Thereafter, the difference between the maximum and minimum values for the calculated gains is determined. If the difference exceeds an acceptable level, the procedure is repeated by beginning at the initial step and substituting a matrix component of the transmission matrix in the subsequent first step. Thereafter, using the new matrix component to assign weighting factors to the plurality of signals.

In accordance with still another aspect of the invention, the invention relates to a multiple-input, multiple-output signal transmitter. In accordance with this aspect, the transmitter includes a plurality of signal inputs, each signal input configured to provide an input signal. The transmitter also includes a plurality of vector multipliers, each vector multiplier is configured to weight an input signal with a vector (V). Furthermore, the transmitter includes a plurality of combiners, each configured to combine a plurality of weighted input signals. The transmitter also includes a plurality of antennas, each configured to transmit the combined weighted input signals.

Various embodiments of the transmitter aspects of the invention disclosed herein are possible. In one embodiment, V includes a matrix of transmitter weighting coefficients, L includes a lower triangular matrix, and the inverse of V is designated $V^{-1}$ such that $V^{-1}L^{-1}$ includes a matrix of receiver weighting coefficients. In another embodiment, a channel matrix H is formed from the product of the lower triangular matrix L and a unitary matrix Q, such that H=LQ. In an additional embodiment, V includes a matrix of eigenvectors for the unitary matrix Q. In yet another embodiment, the at least two antennas include a transmit array, the transmit array configured to transmit each weighted signal along a respective signal path; and wherein each vector V is selected such that the signal strength of each weighted signal received at a receive array along its respective signal path is substantially equivalent. In a further embodiment, the transmit array is further configured to receive transmitted signals from the receive array. In another transmitter embodiment, the matrix Q is decomposable such that $Q = V \Lambda V^{-1}$. In another embodiment of the transmitter, $\Lambda$ is a diagonal matrix including at least one eigenvalue. In yet another embodiment, the at least one eigenvalue has a unit magnitude. In another transmitter embodiment, the matrix V is orthonormal.

In accordance with still another aspect of the invention, the invention relates to a multiple-input, multiple-output signal transmission system. In accordance with this aspect, the transmission system includes a plurality of signal inputs, each signal input configured to provide an input signal and a plurality of transmit vector multipliers, each transmit vector multiplier configured to weight a respective input signal with a vector (V). The transmission system also includes a plurality of transmit combiners, each configured to combine a plurality of weighted input signals; a plurality of transmit antennas, each configured to transmit the combined weighted input signals; and a plurality of receive antennas, each configured to receive the transmitted signals. Furthermore, the transmission system also includes a plurality of receive vector multipliers, each receive vector multiplier configured to weight a respective transmitted signal with a vector of the form $V^{-1}L^{-1}$; a plurality of receive combiners, each configured to combine a plurality of weighted transmitted signals; and a plurality of signal outputs.

Various embodiments of the transmission system aspects of the invention disclosed herein are possible. In an one embodiment of the transmission system, V includes a matrix of transmitter weighting coefficients, L is a lower triangular matrix and the inverse of V is designated $V^{-1}$ such that $V^{-1}L^{-1}$ includes a matrix of receiver weighting coefficients. In another embodiment, H is a channel matrix formed from the product of the lower triangular matrix L and a unitary matrix Q, such that H=L Q. In yet another embodiment, V includes a matrix comprising eigenvectors for the unitary matrix Q. In a still further embodiment, the transmission system further includes a plurality of digital to analog converters, each configured to convert the weighted input signals from digital to analog prior to transmission by the transmit antennas. In another embodiment, the transmission system further includes a plurality of analog to digital converters, each configured to convert the weighted input signals form analog to digital upon reception by the receive antennas. In a further embodiment of the system, the matrix V is orthonormal.

In accordance with yet another aspect of the invention, a method of assigning antenna array weighting factors to a signal for use in a multiple antenna transmitter is provided.

The method includes steps of calculating a transmission matrix H representing a transmission channel through which the signal will be transmitted; using a first decomposition technique to decompose the transmission matrix H into a product of a lower triangular matrix L and a unitary matrix Q, such that H=L Q; and orthogonalizing Q using a second decomposition technique to decompose the unitary matrix Q into a product of matrices. These matrices include a matrix V comprising transmitter weighting coefficients; a diagonal matrix A comprising at least one eigenvalue; and an inverse matrix $V^{-1}$; such that Q=V $\Lambda$ $V^{-1}$. The method further includes the step of combining the results of the first decomposition and the second decomposition such that the transmission matrix H=L V $\Lambda$ $V^{-1}$. In one embodiment of the method all eigenvalues have a unit magnitude resulting in equal SNRs for the output signal. In another embodiment, matrix V is orthonormal providing equal power to each parallel power amplifier.

Additional embodiments are also provided, as described within the specification and attached claims.

In embodiments illustrating each of the foregoing aspects, the signal to noise ratio for multiple signals traversing a transmission channel is preferably optimized. In addition, the weights for each transmitted signal are preferably selected so that the signals traversing a transmission channel each arrive at a respective receive antenna with approximately the same signal strength.

BRIEF DESCRIPTION OF DRAWINGS

These and other aspects of this invention will be readily apparent from the detailed description below and the appended drawings, which are meant to illustrate and not to limit the invention, and in which.

In the drawings, like reference characters generally refer to corresponding parts throughout the differing views.

DETAILED DESCRIPTION OF THE INVENTION

In brief overview, embodiments of the present invention provide systems and methods for increasing the effectiveness of MIMO transmission and reception by selecting signal weights for a plurality of signals which provide equivalent signal strength for each transmitted signal at each receive antenna within a MIMO array.

In addition, embodiments of the present invention provide systems and methods for increasing the effectiveness of MIMO transmission by selecting signal weights for a plurality of signals which provide equal, composite signals strengths to each power amplifier in the MIMO transmitter, thereby assuring equal power back-off from saturation and hence enabling higher power-added efficiency.

Figure 1:
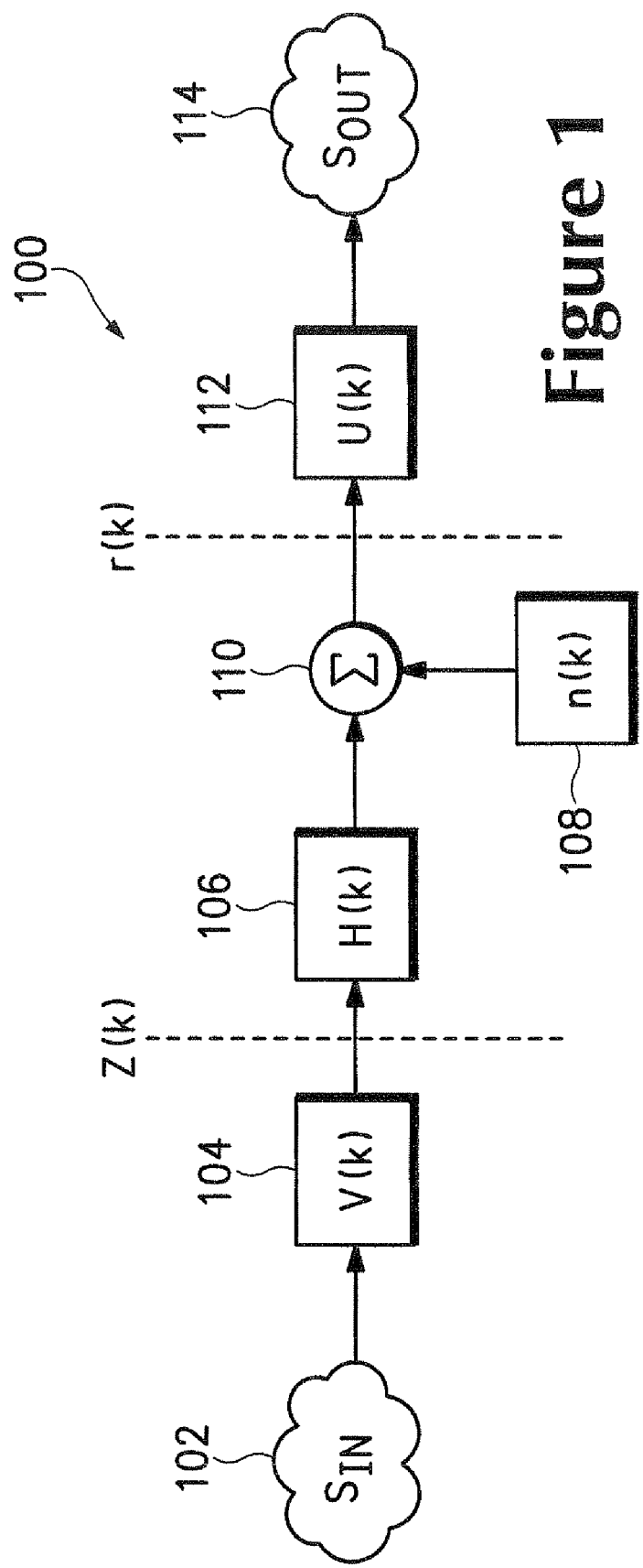
FIG. 1 depicts a high-level schematic diagram of a communications channel illustrating the various signal transformations comprising a MIMO system.

FIG. 1 depicts a high-level schematic diagram of a communications channel, generally designated as 100, illustrating the various signal transformations utilized in a MIMO system. In the preferred embodiment, an input signal $S_{IN}$ 102 represents information that will be transmitted by a MIMO transmitter, through the communications channel 100, and eventually received by a MIMO receiver and decoded to produce an output signal 114. The input signal 102 is a complex vector with one complex entry for each transmit antenna. Preferably, the input signal 102 is weighted by a weighting matrix 104 in order to produce an adaptive array antenna signal z(k) for each time sample k. This signal z(k) is also preferably a complex vector with one complex entry for each transmit antenna. The weighted signal is then upconverted and transmitted wirelessly through a transmission channel 106, which is represented mathematically by a time-varying channel matrix H(k).

The channel matrix 106 represents the transmission channel between the transmit array and the receive array in the MIMO system. As before, the channel matrix 106 is a time varying matrix with one complex entry for each transmission channel at each time sample k. Thermal noise and dynamic environmental variations 108 are preferably represented mathematically by a noise vector n(k). Noise vector n(k) is also preferably a complex vector with one complex entry for each transmission channel at each time sample k. The combination of the environmental variations 108 and the signal 102 occurs in a summation element 110, represented mathematically as a $\Sigma$. The final received signal is mathematically represented by receive vector r(k), again a complex vector quantity. The signal 102 is then preferably weighted by a receive matrix 112, with one complex entry for each receive antenna and multiple signal combination at each time sample k, mathematically represented as U(k), to produce the output signal 114.

Note that in a noise free communications channel 100, all data streams can be recovered perfectly if the channel matrix 106 is full rank. For example, in a system comprising two transmission antennas, two receive antennas and two transmitted signals, two equations and two unknowns can be solved within the channel matrix 106.

Figure 2:
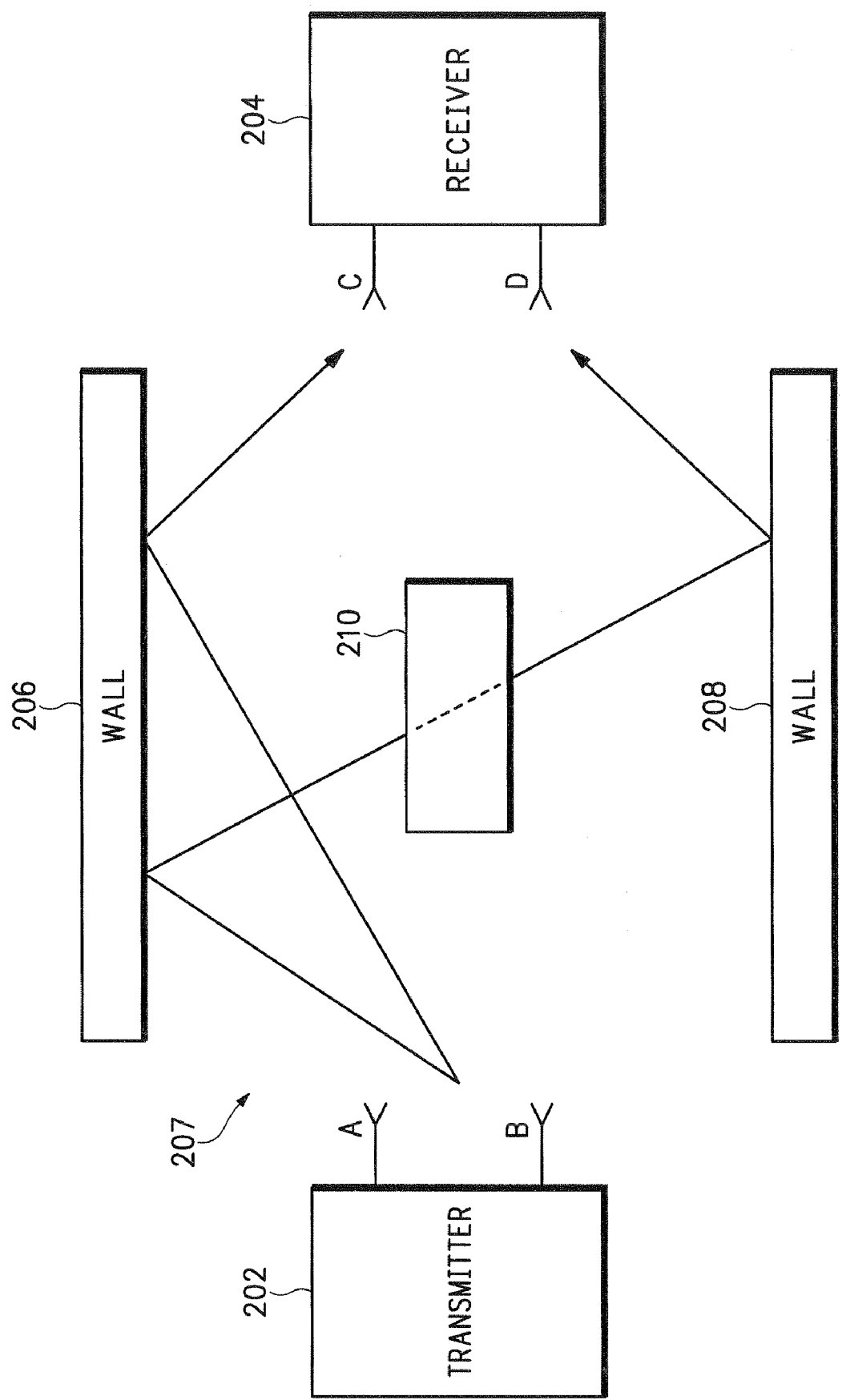
FIG. 2 illustrates an embodiment of a two-input, two-output MIMO system.

FIG. 2 illustrates one embodiment of a two-input, two-output MIMO system. As shown, a transmitter 202 includes at least two antennas A, B. A receiver 204 also includes at least two antennas C, D. Between the transmitter 202 and the receiver 204 are a first wall 206, a second wall 208 and possibly, an obstacle 210.

In this embodiment, the transmitter 202 transmits multiple signals from each of its antennas A, B, to the antennas C, D of the receiver 204. However, the individual signals may travel along very different paths between the transmitter 202 and receiver 204. For example, a first signal, 205 may be broadcast in a first direction from transmit antennas A and B, then reflected off the first wall 206 and arrive at antennas C and D of the receiver 204 from the first direction. At the same time, a second signal 207 may leave transmit antennas A and B in a second direction, reflect off the first wall 206, pass through an obstacle 210, and reflect off the second wall 208 before finally arriving at antennas C and D of the receiver 204 from the second direction.

Preferably, the transmitter 202 transmits signals from each antenna A, B simultaneously. As these signals preferably originate from a single data stream or set of data streams, they may be similar in frequency, magnitude and content. In traditional MIMO systems, these two signals would likely interfere with each other. However, embodiments of the claimed invention minimize or entirely eliminate this unwanted interference.

Figure 3:
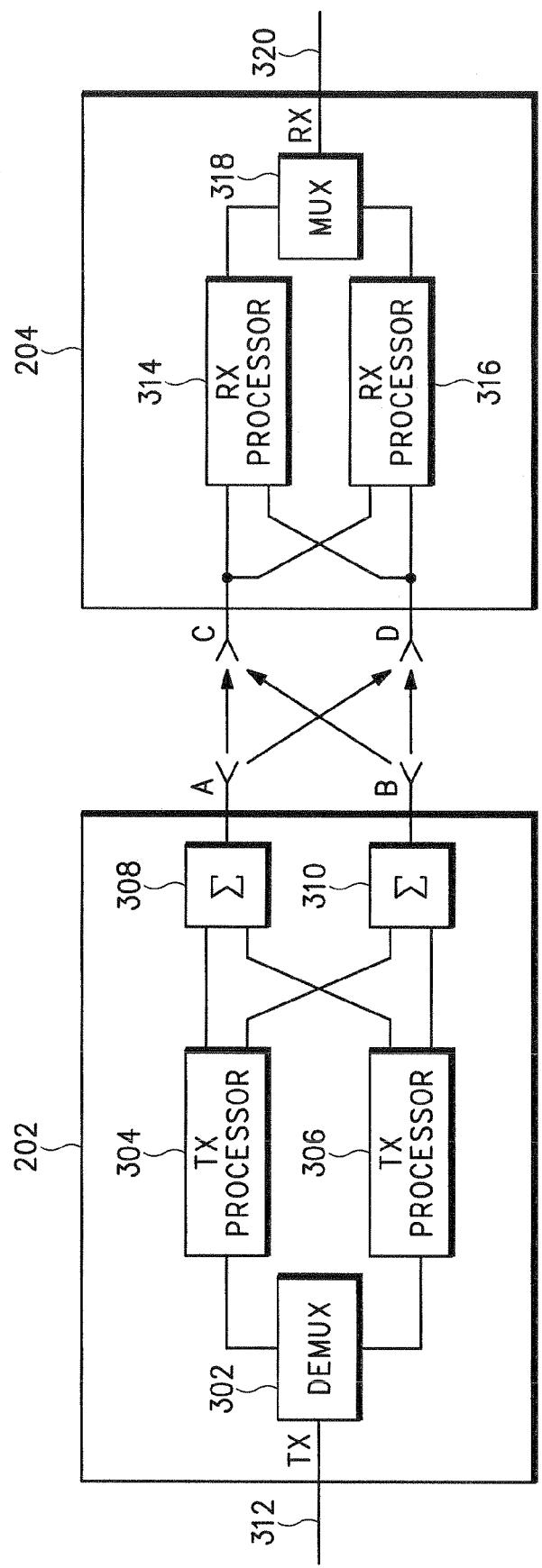
FIG. 3 depicts an expanded block diagram illustrating preferred elements within a transmitter and a receiver.

FIG. 3 depicts an expanded block diagram illustrating preferred elements within the transmitter 202 and the receiver 204. In this embodiment, the transmitter 202 includes a signal input 312, a demultiplexor 302, two transmission processors 304, 306, two summation elements, or combiners 308, 310 and two transmit antennas A, B. The input of the demultiplexor 302 is electrically connected to the signal input 312. The demultiplexor 302 preferably includes at least two outputs, each of which are electrically connected to the inputs of a respective transmission processor 304, 306. Each transmission processor 304, 306 preferably includes at least two outputs, with each output electrically connected to an input of a respective combiner 308, 310. In the illustrated embodiment, the output of a first combiner 308 is electrically connected to transmit antenna A. Similarly, the output of a second combiner 310 is electrically connected to transmit antenna B.

In this embodiment, the receiver 204 includes two receive antennas C, D, two receive processors 314, 316, a multiplexor 318, and a signal output 320. Preferably, the receive antennas C, D are cross-connected with the inputs of the receive processors 314, 316. Accordingly, antenna C is electrically connected to an input of a first receive processor 314 and an input of a second receive processor 316. Similarly, antenna D is electrically connected to another input of the first receive processor 314 and another input of the second receive processor 316. The outputs of the receive processors 314, 316 are then preferably coupled to the input of the multiplexor 318. Thereafter, the output for the multiplexor 318 includes the signal output 320 of the receiver 204.

In operation, a signal enters the transmitter 202 through the signal input 312. The demultiplexor 302 splits the signal into two or more components, and provides these signal components to the transmission processors 304, 306. Preferably, the transmission processors 304, 306 then weight each signal component with a specified weighting vector. As specified previously, this weighting vector preferably includes one complex entry for each transmitter antenna. The weighted signal components are then communicated to the combiners 308, 310, which combine the respective weighted signal components. Thereafter, the two weighted signals are preferably upconverted and transmitted as radio frequency signals through the transmit antennas A, B.

After travelling through the transmission channel (See FIG. 1) the signals are preferably received by two antennas C, D connected to the receiver 204. The antennas C, D then preferably supply the weighted signals to each of the two receive processors 314, 316. In this embodiment, the receive processors 314, 316 multiply each of the received signals by a respective weighting vector. Thereafter, the signals are transmitted to the multiplexor 318, which combines the signals and outputs them through signal output 320.

Figure 4:
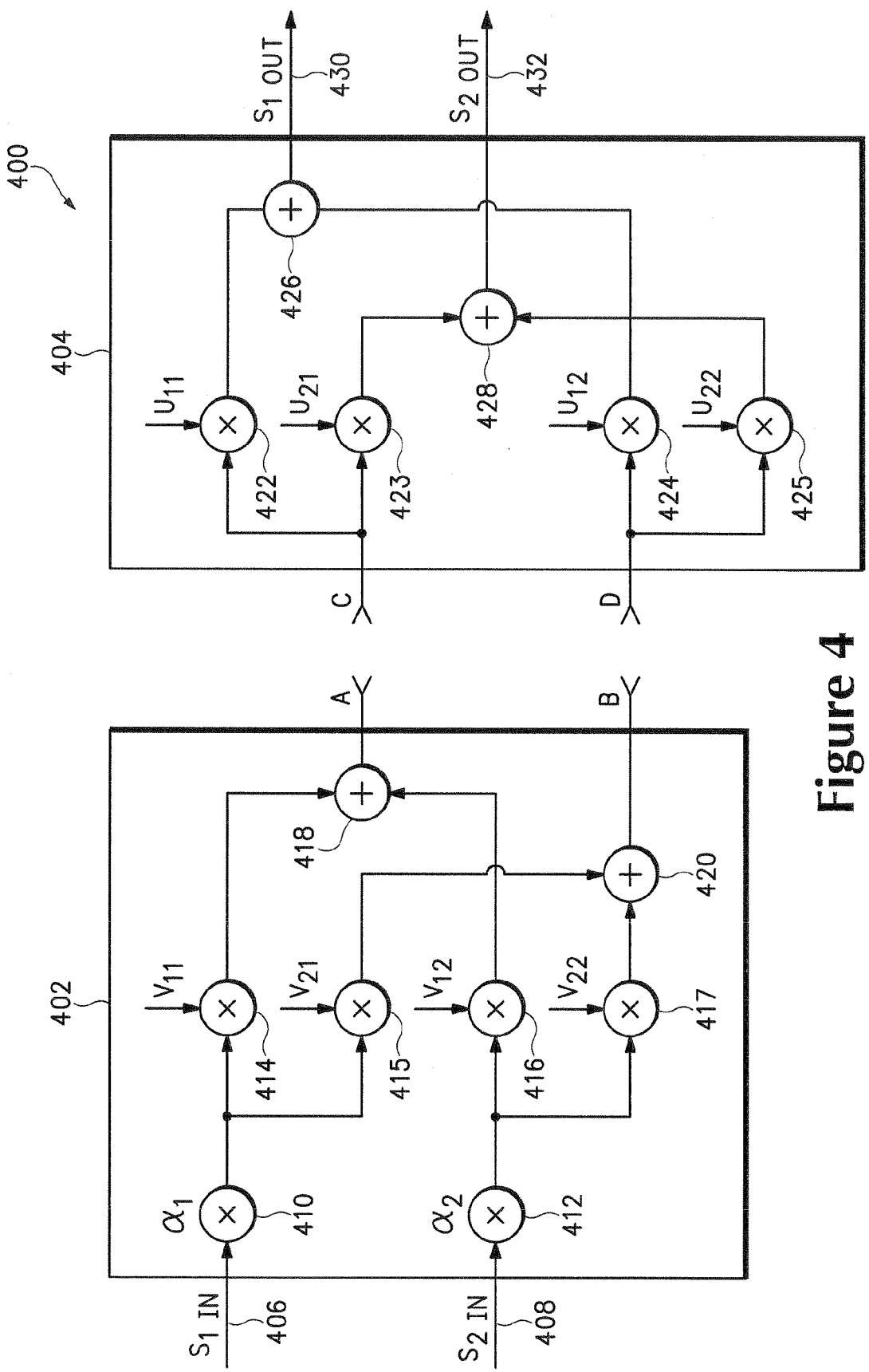
FIG. 4 depicts a 2×2 MIMO system comprising a MIMO transmitter and a MIMO receiver, in accordance with one embodiment of the present invention.

FIG. 4 depicts a 2×2 MIMO system 400 comprising a MIMO transmitter 402 and a MIMO receiver 404. The transmitter 402 includes a first signal input 406, a second signal input 408, two optional water-filling multipliers 410, 412, four transmit multipliers 414-417, two combiners 418, 420 and two transmit antennas A, B. Each water-filling multiplier 410, 412 is configured to multiply a signal by a corresponding water-filling weight $\alpha_1$, $\alpha_2$. Similarly, each transmit multiplier 414, 415, 416, 417 is configured to multiply a signal by a corresponding transmit vector $V_{11}$, $V_{21}$ and $V_{12}$, $V_{22}$. In this embodiment, the input to the first optional water-filling multiplier 410 is preferably connected to the first signal input 406, and its output is electrically connected to the respective inputs for a first transmit multiplier 414, and a second transmit multiplier 415. The output of the first transmit multiplier 414 is electrically connected to a first combiner 418. The output of the second transmit multiplier 415 is electrically connected to a second combiner 420. Similarly, the input to the second optional water-filling multiplier 412 is preferably connected to the second signal input 408, and its output is electrically connected to the respective inputs for a third transmit multiplier 416 and a fourth transmit multiplier 417. The output of the third transmit multiplier 416 is electrically connected to the first combiner 418. The output of the fourth transmit multiplier 415 is electrically connected to the second combiner 420. The first combiner's 418 output is preferably transmitted through antenna A, while the second combiner's 420 output is preferably transmitted through antenna B.

In a conventional MIMO system, water-filling multipliers are chosen so that the individual signal levels at the receiver are equal, hence yielding equal signal-to-noise ratios and packet error rates. However, in doing so, the composite signal strengths provided to the multiple power amplifiers of the MIMO transmitter may be substantially different, resulting in different power back-off, and hence reduced power-added efficiency for the power amplifiers.

Unlike a conventional MIMO system, the water-filling multipliers 410, 412 and their corresponding weights $\alpha_1$, $\alpha_2$ depicted in FIG. 4 are optional and not necessary in this embodiment. This embodiment, however, still maintains equal or near equal signal levels at the MIMO receiver 404 and equal or near equal composite signal levels at the inputs to the multiple power amplifiers of the MIMO transmitter 402. Further, this embodiment maximizes the equal signal levels at the MIMO receiver 404, thereby maximizing the signal-to-noise ratios of the received signals. Accordingly, these water-filling multipliers 410, 412 and the corresponding weights $\alpha_1$, $\alpha_2$ may be absent or varied in alternate embodiments.

The receiver 404 includes four receiver multipliers 422-425, a third combiner 426, a fourth combiner 428, a first signal output 430 and a second signal output 432. Antennas C and D are configured to receive signals transmitted from the transmitter 402. In this embodiment, antenna C is electrically connected to the inputs of a first receiver multiplier 422 and a second receiver multiplier 423. The output of the first receiver multiplier 422 is preferably electrically connected to the input of the third combiner 426. The output of the second receiver multiplier 423 is preferably electrically connected to the input of the fourth combiner 428. In a similar fashion, antenna D is electrically connected to the inputs of a third receiver multiplier 424 and a fourth receiver multiplier 425. Preferably, the output of the third receiver multiplier 424 is electrically connected to an input of the third combiner 426. In addition, the output of the fourth receiver multiplier 425 is preferably electrically connected to an input of the fourth combiner 428. Finally, the output of the third combiner 426 is transmitted to the first signal output 430, while the output of the fourth combiner 428 is transmitted to the second signal output 432. In this embodiment, each receiver multiplier 422, 423, 424, 425 is configured to multiply the signals received by a corresponding receive vector $U_{11}$, $U_{21}$ and $U_{12}$, $U_{22}$.

Mathematical Description.

The following mathematical description describes the computational processing comprising various embodiments of claimed invention with reference to FIGS. 1-4.

In general, any wireless communications link having multiple antennas located at both a transmitting end and at a receiving end can be represented by a transmission matrix H, the elements of which represent the individual transfer functions between all pairs of transmit and receive antennas. In order to make full use of the channel capacity offered by such a link, it is necessary to provide weights at both the transmitter and receiver, such that a resulting cascaded matrix becomes diagonal. Multiple, independent signals can then be transmitted simultaneously from the transmitter to the receiver, as depicted in various embodiments of the claimed invention. One such embodiment is depicted in FIG. 4, which illustrates a 2×2 MIMO system having two transmitter antennas and two receiver antennas. Also shown are the associated processing weights, $V_{jk}$ and $U_{jk}$ for MIMO operation, and optional water-filling weights, $\alpha_j$ as necessary.

If multiple input signals are represented by vector $s_i$ and the multiple output signals are represented by the vector $s_o$, then:

$$s_o = U^T H V s_i$$

Where U represents the vector of weights at the receiver, V represents the vector of weights at the transmitter and $U^T$ represents the transpose of the vector U. If U and V are chosen correctly, then:

$$U^T H V = \Lambda$$

where $\Lambda$ is a diagonal matrix.

As a result, the multiple output signals become representations of the multiple input signals each multiplied by a different value of the principal diagonal of the matrix $\Lambda$.

$$s_o = \Lambda s_i$$

For any matrix H, eigenvectors $x_i$ exist that satisfy the relationship:

$$H x_i = \lambda x_i$$

where $\lambda$ is a complex constant called an eigenvalue. The multiple eigenvector solutions to the above equation can be grouped together as column vectors, in a matrix X. This allows the multiple eigenvector equations to be written as a matrix equation:

$$H X = X \Lambda$$

where the individual eigenvalues form the diagonal elements of the diagonal matrix $\Lambda$.

Matrix Forms.

A Unitary matrix is one whose transposed element values are equal to the complex conjugate of the elements of its inverse:

$$H^T = H^{-1*}$$

A result of the above property is that the individual column (or row) vectors $h_j$ that make up a unitary matrix are mutually perpendicular (orthogonal for a matrix of real values).

$$h_j^{*T} h_k = 1, \text{ where } j = k$$

$$h_j^{*T} h_k = 0, \text{ where } j \neq k$$

In addition, the eigenvalues of a Unitary matrix all lay on the unit circle of the complex plane.

A Hermitian matrix is one whose transposed element values are equal to the complex conjugate of its elements:

$$H^T = H^*$$

Where the superscript ($^H$) denotes conjugate transpose, the following identity applies:

$$H = H^{*T} = H^H$$

A property of a Hermitian matrix is that a matrix composed of its eigenvectors is Unitary. In addition, the eigenvalues of a Hermitian matrix all lay on the positive real axis of the complex plane.

Eigenvalue Decomposition (EVD).

As set forth below, the Eigenvalues of a channel matrix provide a method for diagonalization, and hence for a projected increase in channel capacity with MIMO. For example, in operation of the 2×2 embodiment depicted in FIG. 4, two statistically independent signals, $S_{i\,in}$ are preferably input to the transmitter 402 through the signal inputs 406, 408. The signals are optionally multiplied 410, 412 by water-filling weights $\alpha_i$, and subsequently multiplied 414-417 by the transmitter weights $V_{ij}$ and combined with the associated power combiners 418, 420.

At the transmitter 402, the Eigenvalue Decomposition (EVD) transmitter weights, $V_{ij}$ form column vectors, $V_i$ that establish the individual traffic channels. The water-filling weights, $\alpha_i$ can be used to help increase channel capacity by allowing the signal levels at the receiver to be equal. However, this will also cause the composite signal levels delivered to the multiple power amplifiers to be different, producing different power back-off and lower power-added efficiency.

The multiple eigenvector equations can be written as the matrix equation:

$$H X = X \Lambda$$

where H represents the link transmission matrix and $\Lambda$ represents a diagonal matrix, the elements of which include the individual eigenvalues. Post-multiplying both sides of the above equation by $X^{-1}$ yields:

$$H = X \Lambda X^{-1}$$

In operation, first consider Eigenvalue Decomposition without water-filling. If the receiver weights $U^T$ are chosen to be the inverse of X, and if the transmitter weights V are chose to be equal to X, then:

$$s_0 = U^T H V s_i$$
$$= X^{-1} H X s_i$$
$$= X^{-1} X \Lambda X^{-1} X s_i$$

And:

$$s_0 = \Lambda s_i$$

One difficulty with Eigenvalue Decomposition is that there is no certainty that the channel matrix will be full rank, thereby ensuring a sufficient number of eigenvectors. A second difficulty with Eigenvalue Decomposition is that the eigenvectors are not mutually perpendicular, since the weighting matrices formed from the eigenvectors are not Unitary. This can result in cross-talk between the multiple signals on the link.

A third difficulty with Eignevalue Decomposition is that the eigenvalues may vary greatly in magnitude. Large variations in magnitude result in better signal-to-noise ratios for some of the signal channels $s_o$, at the expense of the signal-to-noise ratios for some others. To some extent this can be compensated for using water filling techniques, described below.

The channel capacity for a Gaussian channel is given by:

$$C_i = \log_2(1 + P_i)$$

where $P_i$ represents the channel signal to noise ratio, $SNR_i$, at the receiver. Water-filling is a method that increases the total capacity for a multiple channel link, by filling each channel to a common level, D:

$$1/\lambda_1 + P_1 = 1/\lambda_2 + P_2 = \ldots = D$$

where the eigenvalues, $\lambda_i$ represent the gains for the channels. For independently corrupted channels, the total signal to noise ratio at the receiver is the summation of the signal to noise ratios for the individual channels, $P_i$:

$$P = \Sigma P_i$$

The water-filling coefficients are then given by:

$$\alpha_i = P_i / P$$

As a result, the channel with the highest gain (largest eigenvalue) will receive the largest share of the power.

A fourth difficulty with Eigenvalue Decomposition is that the composite signal levels delivered to the multiple power amplifiers will most likely be different, producing different power back-off and lower power-added efficiency.

Singular Value Decomposition (SVD).

Again, consider the 2×2 embodiment depicted in. FIG. 4. In this embodiment, two statistically independent signals, $S_{i\,in}$ are preferably input to the transmitter 402 through the signal inputs 406, 408. The signals are optionally weighted by water-filling weights 410, 412 $\alpha_i$ and subsequently weighted by the transmit weights 414-417 $V_{ij}$ and combined with the associated power combiners 418, 420.

Here, the SVD weights, $V_{ij}$ form column vectors, $V_i$ that help to establish the individual traffic channels, and the optional water-filling weights, $\alpha_i$ help to increase the channel capacity.

Similarly, the signals arriving from the receive antennas C, D, pass through the SVD receive weights $U_{ij}$ 422-425. Again, these weights form column vectors, $U_i$ that help to establish the individual traffic channels.

The transmission matrix, H representing individual paths from the various transmitter antennas to the various receiver antennas, includes various elements $H_{ij}$.

For any matrix, H, the Gramm matrix $H^H H$ and the outer product matrix $H H^H$ are both Hermitian. As before, the $^H$ superscript denotes a conjugate transpose operation.

Further, the Eigenvalues, $\lambda_{ij}$ have the same values for both $H^H H$ and $H H^H$. Hence:

$$(H^H H) V = V \Lambda$$

and:

$$(H H^H) U = U \Lambda$$

where $\Lambda$ is the diagonal matrix of $\lambda_i$, U is the unitary matrix $[U_1, U_2 \ldots U_n]$ of eigenvectors of $G = H H^H$ and V is the unitary matrix $[V_1, V_2 \ldots V_n]$ of eigenvectors of $H^H H$. In order to satisfy both of the above eigenvector equalities (for the Gramm matrix and for the outer product matrix), the channel transfer matrix can be written as:

$$H = U \Lambda^{1/2} V^H$$

In operation, first consider Singular Value Decomposition without water-filling. Here, the input signals, $S_{i\,in}$ pass through the transmitter SVD weights, $V_{ij}$ and are radiated through the transmission matrix, H to the receive antennas. Mathematically, this can be represented by H V. From the above equation, this can also be represented by:

$$HV = U \Lambda^{1/2} V^H V$$
$$= U \Lambda^{1/2}$$

Upon reception, the signals pass through the receiver SVD weights, $U_{ij}$ to form the output signals, $S_{i\,out}$. Using the above equation, this can be represented by:

$$s_0 = U^H H V s_i$$
$$= U^H U \Lambda^{1/2} s_i$$
$$= \Lambda^{1/2} s_i$$

Writing this explicitly for each individual output signal, $S_{i\,out}$ yields:

$$S_{i\,out} = \lambda_i^{1/2} S_{i\,in}$$

One advantage of Singular Value Decomposition is that full rank of the decomposition process is guaranteed, thereby ensuring the required number of singular values (the square root of the eigenvalues of the Gramm matrix).

A second advantage of Singular Value Decomposition is that the eigenvectors are all mutually perpendicular, since the weighting matrices formed from the eigenvectors are Unitary. This can result in significant suppression of cross-talk between the multiple signals on the link.

A third advantage of Singular Value Decomposition is that, since the matrix formed by the transmitter complex weights is unitary, the composite signal strengths delivered to the multiple power amplifiers of the MIMO transmitter will by equal.

One disadvantage with Singular Value Decomposition is that, while the eigenvalues are real, they may vary greatly in magnitude. Large variations in magnitude result in better signal-to-noise ratios for some signal channels $s_o$, at the expense of the signal-to-noise ratios for others. Water-filling techniques can compensate for this disadvantage, to a certain extent, but will cause unequal contributions to the composite signal strengths being delivered to the transmitter power amplifiers. This will result in an overall decrease in signal levels delivered to the receiver with real, power limited power amplifiers.

Once the transmission matrix, H of the channel has been determined, the Hermitian matrix, G can be found. Let H be given as:

$$H = \begin{bmatrix} H_{11} & H_{12} \\ H_{21} & H_{22} \end{bmatrix}$$

Then:

$$G = \begin{pmatrix} |H_{11}|^2 + |H_{12}|^2 & H_{11}^* H_{21} + H_{12}^* H_{22} \\ H_{11} H_{21}^* + H_{12} H_{22}^* & |H_{22}|^2 + |H_{21}|^2 \end{pmatrix}$$

$$= \begin{pmatrix} a & c \\ c^* & b \end{pmatrix}$$

And:

$$\lambda_{max} = 1/2 \left( a + b + \sqrt{(a-b)^2 + 4|c|^2} \right)$$

$$\lambda_{min} = 1/2 \left( a + b - \sqrt{(a-b)^2 + 4|c|^2} \right)$$

Unit Magnitude Decomposition (UMD).

An arbitrary channel matrix H can be written as the product of a unitary matrix Q and an upper triangular matrix R.

$$H = Q R$$

or:

$$H R^{-1} = Q$$

Here, Q and $R^{-1}$ can be found using the Gram-Schmidt procedure (or using the Householder or Givens transformations).

Now, the unitary matrix can be expressed in terms of its eigenvectors and eigenvalues as:

$$Q V = V \Lambda$$

or:

$$Q = V \Lambda V^{-1}$$

where the eigenvalues of $\Lambda$ lay on the unit circle. Combining the two expressions yields:

$$H R^{-1} = V \Lambda V^{-1}$$

or:

$$H = V \Lambda (V^{-1} R)$$

If the weights on the transmitter are set equal to ($R^{-1}$ V), then the signals at the receiver antennas become:

$$H(R^{-1} V) = V \Lambda$$

In addition, if the weights on the receiver are set equal to $V^{-1}$, the matrix relating the input signals $s_i$ to the output signals $s_o$ becomes:

$$V^{-1} H (R^{-1} V) = \Lambda$$

and:

$$s_o = \Lambda s_I$$

Unit Magnitude Decomposition thus decomposes an arbitrary channel matrix into the product of a Unitary matrix and an Upper triangular matrix. Since the eigenvalues for a unitary matrix all lay on the unit circle, the signal-to-noise ratios for each of the signals $s_o$ will be equal, thereby minimizing packet error rate degradation due to unequal signal-to-noise ratios. However, in this procedure there is no guarantee that the decomposition will be full rank, resulting in the required number of eigenvalues. Further, there is no guarantee that the eigenvectors will be orthogonal, or that the composite signal levels delivered to the transmitter power amplifiers will be equal.

Accordingly, the weights of both a transmitter and a receiver can be determined by employing the mathematical operators described above.

Alternative Unit Magnitude Decomposition (AUMD)

The Unit Magnitude Decomposition (UMD) technique discussed above represents one technique for decomposing a system channel matrix H. This technique is advantageous in some applications because it yields equal signal-to-noise ratios at the outputs of the receiver, for the multiple data streams in a MIMO system or device. However, in some embodiments of the UMD technique, equal signal levels at the transmitter power amplifiers are not achieved. This can occur when the transmitter weighting coefficient matrix $R^{-1}$ V is not orthonormal. Accordingly, in some instances, a reduction in the range of the wireless link as well as the power efficiency of the transmitter can occur. In light of these possible constraints, in some instances, it is desirable to consider the Alternative Unit Decomposition (AUMD) technique for use with various system, method and device embodiments of the invention.

According to one embodiment of the AUMD technique, an arbitrary channel matrix H can be written as the product of a lower triangular matrix L and a unitary matrix Q.

$$H = L Q$$

The AUMD technique is based upon a decomposition of the L Q product followed by an eigenvalue decomposition on Q. In contrast, the UMD approach uses a Q R decomposition followed by an eigenvalue decomposition on Q.

Once the channel matrix H has been determined, the unitary matrix Q can then be orthogonalized using eigenvalue decomposition. As a result, the unitary matrix Q can be expressed in terms of its eigenvectors and eigenvalues as:

$$Q = V \Lambda V^{-1}$$

Similarly, a direct substitution for Q allows the channel matrix to be expressed as:

$$H = L V \Lambda V^{-1}$$

If the transmitter weighting coefficients are chosen to be V, and the receiver weighting coefficients are chosen to be $V^{-1} L^{-1}$, then the output signals $S_0$ will be related to the input signals $S_i$ by:

$$S_0 = (V^{-1} L^{-1}) H(V) S_i$$
$$= (V^{-1} L^{-1})(L V \Lambda V^{-1})(V) S_i$$

And thus:

$$S_o = \Lambda S_I$$

The AUMD also enables MIMO operation with equal signal-to-noise ratios at the receiver outputs. Again, this is a result of the eigenvalues in $\Lambda$ all having unit magnitudes. In addition, the AUMD technique provides equal signal levels at the transmitter power amplifiers, since the transmitter weighting coefficient matrix V is now orthonormal. Accordingly, the weighting coefficients of both a transmitter and a receiver can be determined by employing the mathematical operators described above while obtaining the benefits associated with equal signal levels.

Successive Decomposition With a Final SVD.

In alternate embodiments, a Successive Decomposition with a Final SVD procedure may initially make use of Singular Value Decomposition to ensure orthogonal complex weighting vectors (orthogonal eigenvectors) for each signal. If the resulting gains or eigenvectors for each signal vary greatly in magnitude, then instead of using SVD, the channel matrix is decomposed using a known decomposition procedure into a new matrix, R pre-multiplied by a unitary matrix and post-multiplied by the adjoint matrix of the unitary matrix. Decomposition procedures that achieve the above include the Schur decomposition as well as the Hessenberg decomposition.

The Schur decomposition converts a complex square matrix, H into the product of a unitary matrix Q, an upper triangular matrix, R, and the adjoint matrix of the unitary matrix, Q*.

$$H = Q R Q^*$$

Like the Schur Decomposition, the Hessenberg Decomposition converts a complex square matrix, H into the product of a unitary matrix, Q, a Hessenberg matrix, A, and the adjoint matrix of the unitary matrix, Q*. The Hessenberg matrix has zero for the values of all elements below the diagonal immediately below the principal diagonal.

The new matrix is then further decomposed using SVD, and since the orthogonal eigenvectors of SVD cascade with the first pre-multiplied unitary matrix and the second post-multiplied unitary matrix, the complex weighting vectors for each signal remain orthogonal. If the gains (singular values)

of the SVD of the new matrix are within an acceptable range, then the procedure is completed. However if the gains vary greatly in magnitude, the process is repeated with one of the known decomposition procedures being applied to the new matrix, R. The procedure is repeated until the eigenvalue gains are within an acceptable range. One skilled in the art will readily recognize that the acceptable range would vary with each specific embodiment, but may include, without limitation, gain variances between about 150% and 300%. Mathematically, this technique can be illustrated as set forth below.

After performing a Singular Value Decomposition, the channel matrix H can be represented as:

$$H = U_0 \Lambda_0^{1/2} V_0$$

If decomposition of the channel matrix H results in singular values that vary greatly in magnitude, then the channel matrix can be alternatively decomposed using a Schur Decomposition procedure or a Hessenberg procedure. This decomposition converts a complex square matrix, H into the product of a unitary matrix $Q_1$, a new matrix $R_1$, and the adjoint matrix of the unitary matrix $Q^*_1$. Thus, for the Schur or Hessenberg Decomposition, we have:

$$H = Q_1 R_1 Q^*_1$$

The new matrix, $R_1$, can then be decomposed using SVD to achieve a new diagonal matrix (of singular values), $\Lambda_1^{1/2}$ pre-multiplied by a unitary matrix $U_1$ and post-multiplied by another unitary matrix $V_1$.

$$R_1 = U_1 \Lambda_1^{1/2} V_1$$

Combining the Schur (or Hessenberg) Decomposition and the Singular Value Decompositions yields:

$$H = Q_1 U_1 \Lambda_1^{1/2} V_1 Q_1^*$$

Since the multiplication of two unitary matrices results in a new unitary matrix, we have:

$$H = U_2 \Lambda_1^{1/2} V_2$$

This is a new decomposition having unitary matrices (composed of orthogonal eigenvectors) and a diagonal matrix with new singular values. If the singular values have magnitudes that are within an acceptable range, the Successive Decomposition with a Final SVD is finished. However, if the singular values vary greatly in magnitude, the process is repeated with the Schur (or Hessenberg) Decomposition being applied to the new matrix $R_1$.

$$H = Q \Lambda Q^*$$

The procedure can, in fact, use both the Schur and Hessenberg Decomposition at each iterative stage, and select the Decomposition which produces eigenvalue gains that are most tightly bound. Other matrix Decomposition operations that result in a new matrix pre-multiplied and post-multiplied by unitary matrices can also be used in the Successive Decomposition with a Final SVD procedure.

The SVD procedure provides full rank (ensuring the necessary number of eigenvalues), orthogonal eigenvectors (minimizing signal cross-talk), equal composite power levels to the multiple power amplifiers (minimizing back-off from saturation), and, with water-filling, equal power levels at the receiver. The water-filling, however, actually decreases the (equal) power levels at the receiver to levels below what is achievable. Thus, Successive Decomposition With a Final SVD ensures full rank, orthogonal eigenvectors, equal composite power levels to the multiple power amplifiers, and near equal power levels at the receiver at the maximum level achievable (since water-filling is not used). Since the cascaded unitary matrices reduce to another unitary matrix, the eigenvectors will be orthogonal, and the composite signal strength delivered to the transmitter power amplifiers will be equal. Finally, the eigenvalues will be bounded within an acceptable range.

In alternate embodiments, the channel matrix values can be measured a priori using known techniques and the appropriate decomposition can be calculated. Thereafter, the weights may be transmitted from the transmitter to the receiver or from the receiver to the transmitter.

Figure 5:
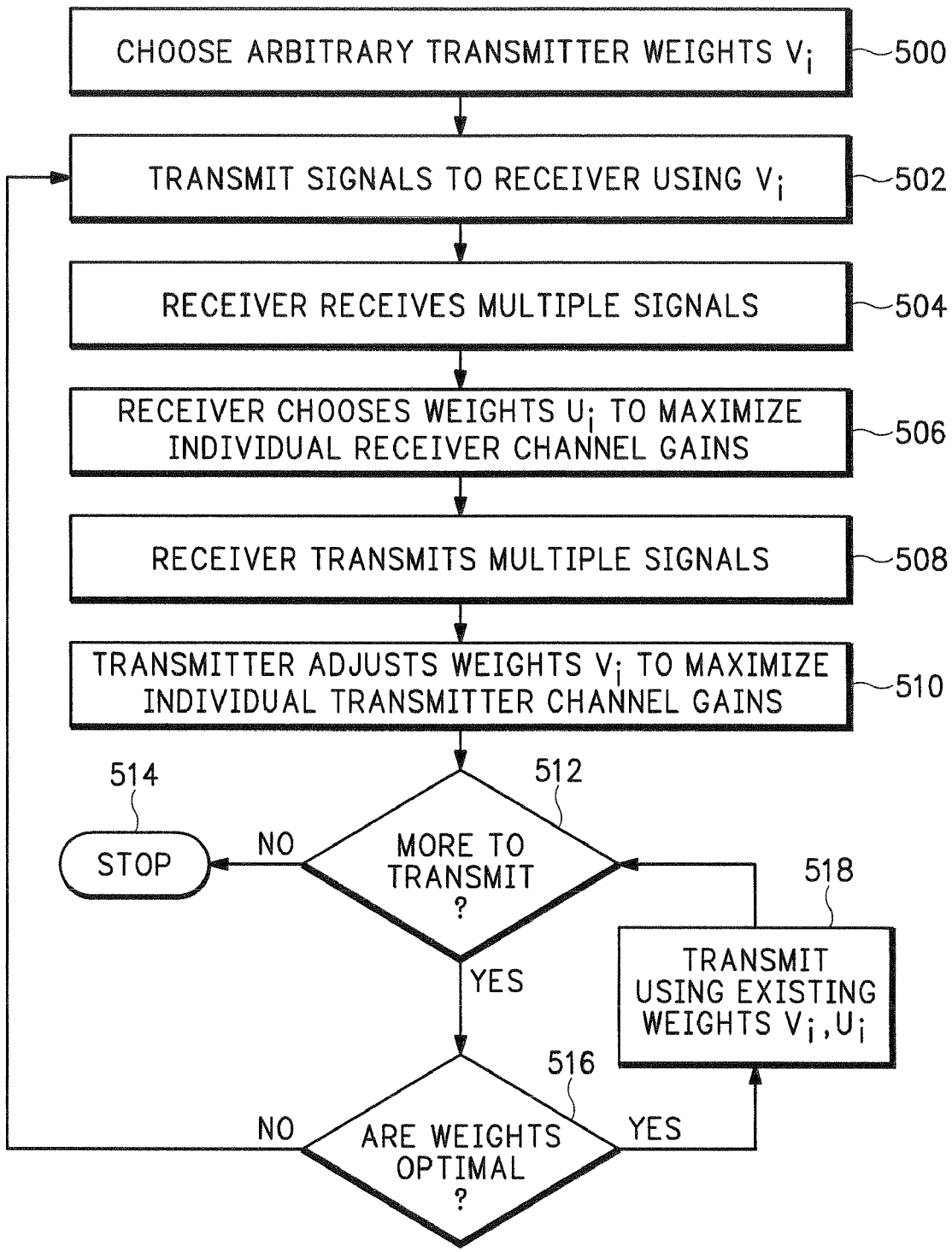
FIG. 5 is a flow chart representing a weighting method for a MIMO system, in accordance with another embodiment of the present invention.

FIG. 5 is a flow chart representing a weighting method for a MIMO system, in accordance with another embodiment of the present invention. As illustrated in this embodiment, an elegant and rapid iterative optimization can be used to obtain the transmission and receive weighting values through an unspecified decomposition. Preferably, the wireless communications channel in this embodiment includes a Time Division Duplex (TDD) channel, however other channels are also appropriate.

In this embodiment, the transmitter weights at one end of the link, $V_i$ are arbitrarily set equal at initialization (step 500). Through the forward link, the transmitter broadcasts signals through a plurality of channels to the receiver using the transmitter weights $V_i$ (step 502). The receiver then receives the signals broadcast from the transmitter (step 504). Upon reception of the signals at the receiver, the receive weights $U_i$ are chosen to maximize each channel's individual gain (step 506). These chosen receive weights, $U_i$ are then preferably used for transmission on the reverse link, since the wireless LAN channel is reciprocal (step 508). Upon reception, the transmit weights $V_i$ are preferably chosen to maximize each channel's individual gain (step 510) for the reverse link. In this embodiment, the decomposition finally achieved is not predictable.

After the transmitter has adjusted its weights accordingly, the system in this embodiment determines whether or not there is more information available for transmission (step 512). If not, the method ends (step 514). If there is more information to be transmitted, the system preferably determines whether or not the weights are optimal (step 516). Preferably, the iterative adjustment of the weights on the forward and reverse links will converge to the Unitary system of vectors $V_i$ and $U_i$. Accordingly, if the transmitter determines that its weights $V_i$ have converged to a Unitary matrix, then condition for step 516 could be deemed true. One skilled in the art will also recognize that many other methods and processes may also be used to determine whether or not the weights $V_i$ and $U_i$ are optimal, in accordance with step 516. For example, in alternate embodiments, the determination of whether or not the weights are optimal may include, without limitation, determining:

(a) whether the weights $V_i$ and $U_i$ are selected such that the signal strength of each weighted signal received at a receive array along its respective signal path is substantially equivalent;

(b) whether the eigenvalues of a channel matrix between the receiver and the transmitter have equal magnitudes;

(c) whether the eigenvalues of the channel matrix lie substantially on the unit circle of the complex plane;

(d) whether the nulls of the array and the nulls of the transmitter and the receiver have been configured such that the signal strength of each weighted signal received at the receiver along its respective signal path is substantially equivalent; or (e) a combination of any of the foregoing.

If the weights $V_i$ and $U_i$ are deemed optimal in step 516, then the system transmits additional signals using the existing weights (step 518). Otherwise, the system returns to step 502, and repeats the iterative process, further refining the weights through each successive iteration.

Figure 6:
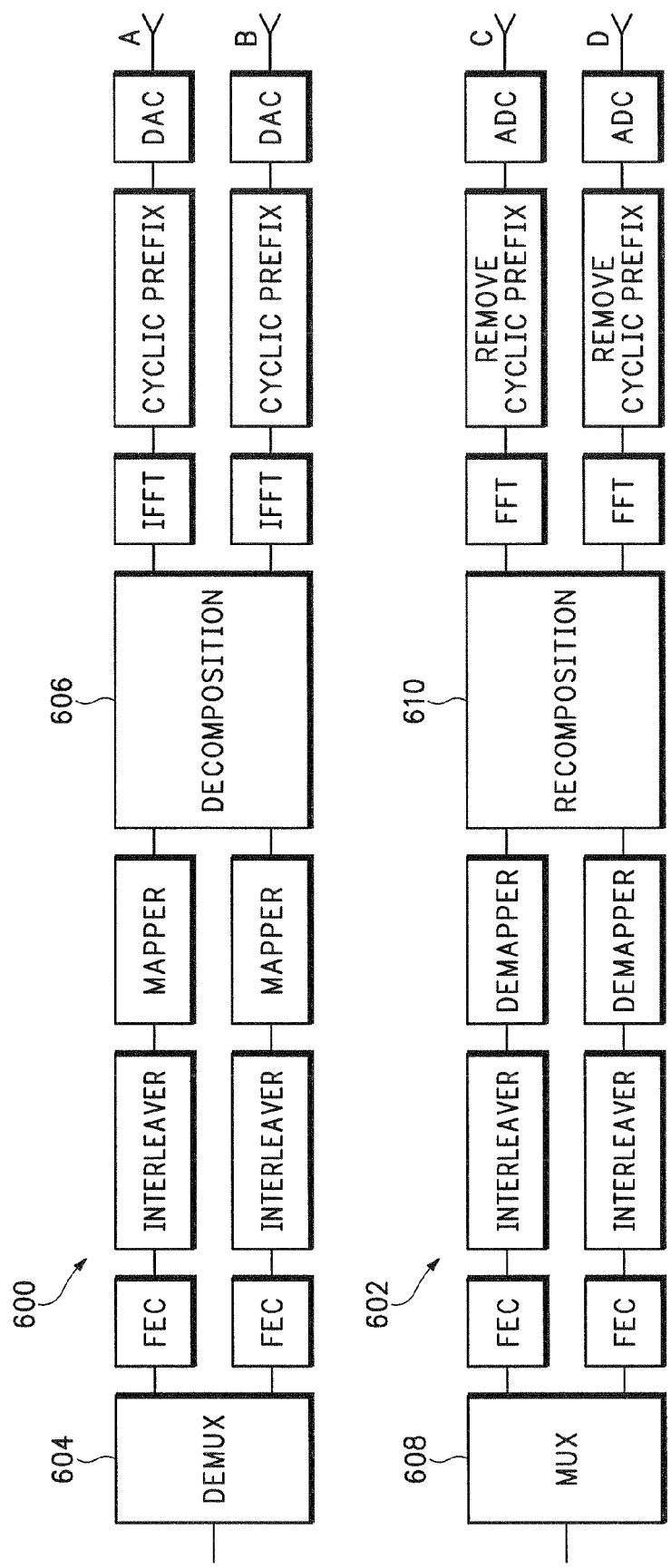
FIG. 6 shows a block diagram illustrating certain signal processing functions incorporated into yet another embodiment of the claimed invention.

FIG. 6 shows a block diagram illustrating certain signal processing functions incorporated into one embodiment of the claimed invention. This embodiment includes a transmitter 600 and a receiver 602, which are preferably capable of broadcasting and receiving signals according to the IEEE 802.11a standard. In alternate embodiments, the transmitter 600 and receiver 602 may be configured to transmit and receive signals defined by other specifications, including, without limitation, IEEE 802.11b, 802.11g, or any radio frequency signal, including, without limitation, IS95. Preferably, this embodiment provides a two-times data rate enhancement. The MIMO functions, as described previously, are preferably accomplished through the use of the demultiplexor 604 and decomposition block 606 in the transmitter and the multiplexor 608 and recomposition block 610 in the receiver.

In operation, the demultiplexor 602 preferably separates a high data rate input signal (for example, approximately 108 Mbps) into two parallel lower rate signals (for example, 54 Mbps), each traversing a standard set of communications operations. The two OFDM modulated sub-carriers are output, in the time domain, from the two antennas A, B. In the receiver 602, the recomposition block 610 preferably separates the blended signals back into their two original, individual data streams. These data streams then undergo further standard operations before being recombined by the multiplexor 608 to form the original high data rate signal.

In this embodiment, the decomposition operation is shown to take place on all sub-carriers together for an OFDM signal. One skilled in the art will readily appreciate that in situations having a high degree of frequency selective fading, the decomposition operation can also be performed on smaller groups of sub-carriers, or on each sub-carrier individually.

In alternative embodiments, the two parallel chains of computational operations in both the transmitter 600 and receiver 602, as shown in FIG. 6, could also potentially be replaced with a single chain performing the operations of the two chains sequentially in time at double the clock rate. This topology has the advantage of smaller size and construction cost at the expense of consuming higher power per gate, based upon the increased clock rate.

In a MIMO environment, in order to realize the potential increase in data throughput rate, the received signals should preferably have a high signal to noise plus interference ratio (SNIR). Accordingly, a SNIR on the order of about 25 dB is preferable. This ratio is markedly higher than a non-MIMO communications link, which typically mandates a SNIR of only about 10 dB. This required SNIR ratio also implies a requirement for very low, externally generated, co-channel interference.

Even when a high SNIR is attained, MIMO operation frequently requires a very high degree of linearity in the front-end analog and RF circuits of the transceiver in order to achieve the maximum potential increase in data throughput rate. Furthermore, group-delay dispersion and diffuse angle-of-arrival can also severely restrict the potential increase in data throughput rate.

These non-ideal front-end circuit and non-ideal channel limitations can be more easily addressed by eliminating the sources of the problems at the receiver input, rather than by canceling the impairments with signal processing in the back-end. Techniques such as adaptive predistortion of the transmitter power amplifiers can be used There are many advantages that embodiments of the present invention enjoy over the prior art. For example, embodiments employing Unit Magnitude Decomposition to obtain weighting coefficients used in the transmitter and the receiver effectively locate the eigenvalues of the respective weighting matrices on the unit circle of the complex plane, resulting in all signals enjoying the same signal-to-noise ratio, independent of environment. In other embodiments employing the Successive Decomposition with a Final SVD techniques, the weighting vectors are orthogonal, thereby minimizing crosstalk and ensuring equal composite power levels to the multiple power amplifiers, while at the same time the eigenvalues are bound within an arbitrarily small range, thereby equalizing individual channels' signal-to-noise ratios.

Advantageously, embodiments of the present invention also make use of processing available at both the transmitter and receiver. This processing not only provides increased data throughput, but also full order diversity against fading signal levels. Furthermore, processing at both the transmitter and receiver, as specified herein, is particularly advantageous when the forward and reverse channels are identical, as in Time Division Duplexing links. Not only do the transmitters at both ends of the link have knowledge of the same channel, their individual weights can be used for both transmission and reception.

In addition to being attractive for TDD channels, processing at both the transmitter and receiver is attractive where reasonable processing power exists at both channel ends. It is also attractive where reasonable antenna separation is available at both ends of the link. Accordingly, embodiments of the present invention make use of the processing power provided by modern electronic devices, such as laptop computers, in order to increase wireless data throughput.

It will be appreciated, by those skilled in the art, that various omissions, additions and modifications may be made to the methods and systems described above without departing from the scope of the invention. All such modifications and changes are intended to fall within the scope of the invention as illustrated by the appended claims.

I claim:

1. A multiple-input, multiple-output signal transmitter comprising:

a plurality of signal inputs, each signal input configured to provide an input signal;

a plurality of multipliers, each multiplier configured to weight an input signal with a respective value of a vector (V);

a plurality of combiners, each combiner configured to combine respective ones of the plurality of weighted input signals; and a plurality of antennas, each antenna configured to transmit one of the combined weighted input signals;

wherein V comprises a matrix of transmitter weighting coefficients, L comprises a lower triangular matrix, and the inverse of V is designated $V^{-1}$ such that $V^{-1}L^{-1}$ comprises a matrix of receiver weighting coefficients.

2. The transmitter of claim 1, wherein each of the plurality of antennas is configured to transmit one of the combined weighted input signals through a transmission channel represented by a channel matrix H that is a product of the lower triangular matrix L and a unitary matrix Q, such that H=LQ.

3. The transmitter of claim 2, wherein V comprises a matrix comprising eigenvectors for the unitary matrix Q.

4. The transmitter of claim 2, wherein:
- at least two of the plurality of antennas comprise a transmit array, the transmit array configured to transmit at least two of the combined weighted input signals along a respective signal paths; and
- the value of the vector V is selected such that the signal strength of the at least two combined weighted input signals received at a receive array is substantially equivalent to the at least two weighted input signals transmitted from the transmit array.

5. The transmitter of claim 4, wherein the transmit array is further configured to receive corresponding transmitted signals from the receive array.

6. The transmitter of claim 2, wherein the matrix Q is decomposable such that $Q=V \Lambda V^{-1}$, wherein $\Lambda$ is a diagonal matrix comprising at least one eigenvalue.

7. The transmitter of claim 6, wherein all eigenvalues have a unit magnitude.

8. The transmitter of claim 6, wherein the matrix V is orthonormal.

9. A multiple-input, multiple-output signal transmission system comprising:
- a plurality of signal inputs, each signal input configured to provide an input signal;
- a plurality of multipliers, each multiplier configured to weight a respective input signal with a respective value of a vector (V);
- a plurality of transmit combiners, each transmit combiner configured to combine respective ones of the plurality of weighted input signals;
- a plurality of transmit antennas, each transmit antenna configured to transmit one of the combined weighted input signals;
- a plurality of receive antennas, each receive antenna configured to receive the transmitted signals;
- a plurality of receive vector multipliers, each receive vector multiplier configured to weight a respective received signal from a one of the plurality of receive antennas with a respective value of a vector of the form $V^{-1}L^{-1}$, wherein L comprises a lower triangular matrix and the inverse of V is designated as $V^{-1}$;
- a plurality of receive combiners, each receive combiner configured to combine a plurality of the weighted received signals; and
- a plurality of signal outputs.

10. The system of claim 9, wherein $V^{-1}L^{-1}$ comprises a matrix of receiver weighting coefficients.

11. The system of claim 9, wherein each of the plurality of transmit antennas is configured to transmit one of the combined weighted input signals through a transmission channel represented by a channel matrix H that is a product of the lower triangular matrix L and a unitary matrix Q, such that H=LQ.

12. The system of claim 10, wherein V comprises a matrix comprising eigenvectors for the unitary matrix Q.

13. The system of claim 9, further comprising a plurality of digital-to-analog converters, each digital-to-analog converter configured to convert a one of the combined weighted input signals from digital to analog prior to transmission by the plurality of transmit antennas.

14. The system of claim 13, further comprising a plurality of analog-to-digital converters, each analog-to-digital converter configured to convert a one of the respective received signals from the plurality of receive antennas from analog to digital.

15. The system of claim 9, wherein the matrix V is orthonormal.

16. A method of transmitting a signal through a transmission channel comprising:
- calculating a transmission matrix H representing the transmission channel;
- using a first decomposition technique to decompose the transmission matrix H into a product of a lower triangular matrix L and a unitary matrix Q, such that H=LQ;
- orthogonalizing the unitary matrix Q using a second decomposition technique to decompose the unitary matrix Q into a product of:
  - a matrix V comprising transmitter weighting coefficients;
  - a diagonal matrix $\Lambda$ comprising at least one eigenvalue; and
  - an inverse of matrix V represented as $V^{-1}$, such that $Q=V \Lambda V^{-1}$;
- combining the results of the first decomposition and the second decomposition such that the transmission matrix $H=L V \Lambda V^{-1}$; and
- transmitting the signal through the transmission channel using the transmission matrix H.

17. The method of claim 16, wherein all eigenvalues have a unit magnitude.

18. The method of claim 16, wherein the matrix V is orthonormal.

* * * * *